Feb. 12, 1963 W. A. KUHRT 3,077,073
ROCKET ENGINE HAVING FUEL DRIVEN PROPELLANT PUMPS
Filed Oct. 29, 1957
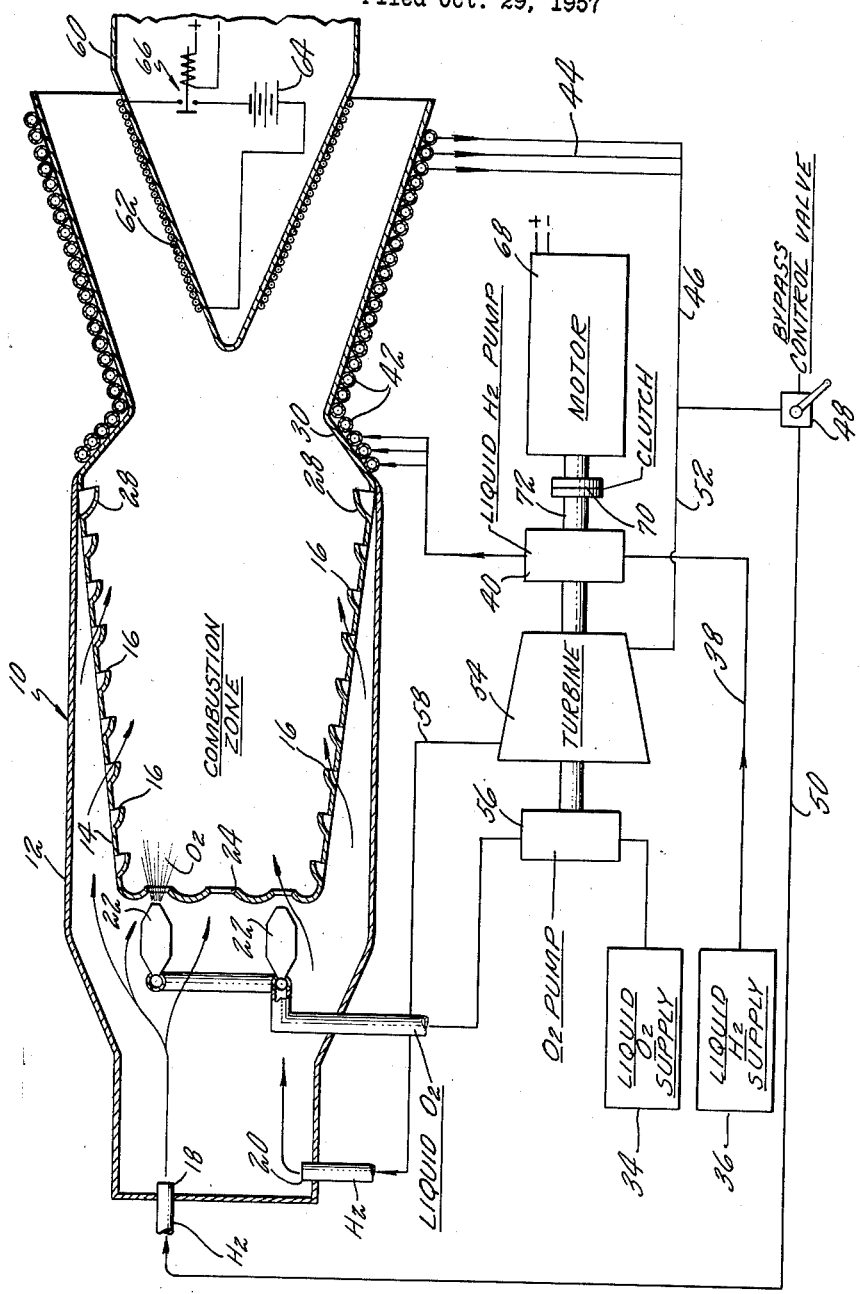
INVENTOR
WESLEY A. KUHRT
BY Leonard F. Walbind
ATTORNEY 3,077,073
ROCKET ENGINE HAVING FUEL DRIVEN
PROPELLANT PUMPS
Wesley A. Kuhrt, East Glastonbury, Conn., assignor to
United Aircraft Corporation, East Hartford, Conn.,
a corporation of Delaware
Filed Oct. 29, 1957, Ser. No. 693,178
7 Claims. (Cl. 60—35.6)

This invention relates to high output power plants and more particularly to liquid hydrogen-liquid oxygen rocket engines.

It is an object of this invention to provide a hydrogen-oxygen type rocket engine which utilizes a combustion section similar to the can type of burners used in turbojet engines.

It is a further object of this invention to provide a power plant of the type described wherein the hydrogen fuel is injected in gaseous form at the upstream end of the combustion chamber while the oxygen is introduced into the burner can in atomized form. In other words the oxygen is injected in its liquid form but in a finely divided spray.

A still further object of this invention is to expand the hydrogen through a turbine to provide power to drive pumps for pumping the fuel and oxidizer from their source of storage into the combustion chamber.

Another object of this invention is to provide means for cooling the combustion chamber and the exhaust nozzle with the hydrogen fuel.

These and other objects of this invention will become readily apparent from the following detailed description of the drawing which is a partial schematic and partial diagrammatic illustration of a power plant system with the combustion section shown enlarged.

Referring to the drawing, a rocket-type power plant is illustrated as having a combustion section or combustor can generally illustrated at 10. The combustion section includes an outer casing 12 and an inner casing 14 which includes a plurality of perforations 16.

According to one of the primary objects of this invention, hydrogen is fed as a gas through the fuel ports 18 and 20 into the outer casing 12 while liquid oxygen is injected as a finely atomized spray through the nozzles 22 directly inside the inner casing 14. The hydrogen then flows in the louvres 24 and the perforations 16 to combine with the oxygen throughout the length of the inner liner 14. The perforations 28 at the downstream end of the inner liner 14 may be somewhat enlarged or may be formed as an annular opening so that excess hydrogen gas may flow along the wall of the convergent-divergent nozzle 30 to form a cooling boundary layer therefor.

The oxygen and hydrogen are stored in liquid form in containers 34 and 36, respectively. The liquid hydrogen is fed via line 38 through a pump 40 and then through a heat exchanger formed by a plurality of tubes 42 which surround the nozzle 30 and part of the combustion chamber if necessary to obtain sufficient gasification of the hydrogen. The hydrogen is then conducted via passages 44 and 46 away from the heat exchanger. A part of the gasified hydrogen from the line 46 is bypassed by a suitable control valve 48 to the line 50 and then directly into the fuel port 18 in the combustion chamber outer casing 12. The remaining portion of the gasified hydrogen passes through the line 52 and is expanded in a suitable turbine 54 which in turn drives the liquid hydrogen pump 40 and the liquid oxygen pump 56. The hydrogen exhausted from the turbine 54 passes to the line 58 and then to the fuel port 20 in the outer casing 12 of the combustion chamber 10.

It is thus seen that separate fuel and power means for driving the necessary pumps is eliminated by using part of the hydrogen fuel in an expander cycle to drive the turbine and thus drive the pumps.

As stated above, the primary feature of the rocket engine of this invention is that the fuel is introduced as a gas and the oxidizer is introduced as an atomizer liquid into the high pressure atmosphere. Furthermore, the combustion section takes the form of the conventional can-type of combustor of turbojet engines. The oxygen is introduced inside the inner casing 14 with the combustion taking place therein as an oxygen-rich mixture. The temperature of this portion of the combustor can is therefore lower than an over-all stoichiometric mixture because of the cooling effect of the excess oxygen. A progression of burning then takes place as the oxygen-rich mixture proceeds downstream inside the inner casing 14. On the other hand, the walls of the burner are cooled by the hydrogen flowing along the surface of the perforated section 14 and the outer lining 12. Since combustion of hydrogen and oxygen emits but a small amount of radiant energy, the walls of the burner can which are not in direct contact with the combustion products do not experience overheating problems. Also, according to this invention, there is an over-all excess of hydrogen provided above that required for stoichiometric combustion of the entire oxygen supply. Thus, the last row or rows of perforations or openings 28 conduct excess hydrogen downstream to provide a boundary layer of cooling fluid.

In order to start the operation of the power plant cycle described, the exhaust nozzle may be supplied with an inner body 16 which includes a high heat capacity coil 62 for heating the nozzle area and thus providing heat for the heat exchanger tubes 42. The heating element 62 may be powered by any suitable source, such as a battery 64 and may be placed in operation by a suitable solenoid switch 66. Also, a suitable electric motor or other power source 68 may be connected by a suitable clutch 70 to the shaft 72 so as to drive the pumps 40 and 56 during the starting period. The motor 68 may be replaced by a suitable external driving source.

As a result of this invention a power plant has been shown which provides a high degree of reliability primarily by the elimination of any auxiliary power for driving the pumps in the system. Furthermore, the construction and arrangement of the combustion section is quite similar to the well-tried combustors of turbojet engines. Furthermore, the combustion section size need not be much larger in volume than the liquid-to-liquid type (fuel to oxidizer) rocket combustion chambers.

Although only one embodiment of this invention has been illustrated and described herein, it will be apparent that various changes and modifications may be made in the construction and arrangement of the various parts without departing from the scope of this novel concept.

What it is desired by Letters Patent is:

1. A power plant including a combustion chamber, an exhaust nozzle receiving gases from said combustion chamber, a source of oxidizer, a heat exchanger adjacent said nozzle, a source of liquid fuel, means for conducting fuel from said source to said heat exchanger including a fuel pump, said fuel being increased in temperature in said heat exchanger, a turbine driven by said heated fuel and located downstream of said heat exchanger, shaft means connecting said fuel pump for being driven by said turbine oxidizer pump means driven by said turbine including fluid connections to said source and said combustion chamber, a conduit including a bypass valve for controlling the amount of fuel bypassing said turbine to control the turbine speed and the output of said pumps, and means for conducting the exhaust fuel flow from said turbine and the flow bypassed by said bypass valve to said combustion chamber.

2. A rocket power plant including a combustion chamber, an exhaust nozzle receiving gases from said combustion chamber, a source of liquid oxidizer, a heat exchanger adjacent said nozzle, a source of liquid fuel, means for conducting fuel from said source to said heat exchanger including a fuel pump, said fuel being increased in temperature in said heat exchanger, turbine means driven by said fuel and located downstream of said heat exchanger, said fuel pump including a shaft being driven by said turbine means whereby any heat generated during pumping is recovered in the fuel and retained in the cycle, a conduit including a bypass valve for controlling the amount of fuel bypassing said turbine means, means for conducting the exhaust flow from said turbine means and the flow bypassed by said bypass valve to said combustion chamber, an oxidizer pump for drawing oxidizer from said oxidizer source, said oxidizer pump being driven by said turbine means, and means separate from said first mentioned conduction means for conducting oxidizer in its liquid state from said oxidizer pump to said combustion chamber to mix with said fuel.

3. A rocket power plant including a combustion chamber, an exhaust nozzle receiving gases from said combustion chamber, a source of liquid oxidizer, a heat exchanger adjacent said nozzle, a source of liquid hydrogen, means for conducting hydrogen fuel from said source to said heat exchanger including a fuel pump, said hydrogen being increased in temperature in said heat exchanger, a turbine driven by said expanding hydrogen and located in the fuel flow path downstream of said heat exchanger, said fuel pump having a shaft being driven by said turbine, a conduit including a bypass valve for controlling the amount of fuel bypassing said turbine, means for conducting the exhaust flow from said turbine and the flow bypassed by said bypass valve to said combustion chamber, an oxidizer pump for drawing oxidizer from said oxidizer source, said oxidizer pump being driven by said turbine, and means separate from said first mentioned conducting means for conducting oxidizer from said oxidizer pump to said combustion chamber to mix with said hydrogen.

4. A rocket power plant including a combustion chamber, an exhaust nozzle receiving gases from said combustion chamber, a source of high energy liquid cryogenic fuel, means for conducting fuel from said source to said combustion chamber including a fuel pump, means for adding heat energy to said fuel, turbine means receiving fuel from said energy adding means including means for expanding said fuel through said turbine means to drive said turbine, said turbine including an inlet and an exhaust, means connecting said fuel pump with said turbine means including a movable drive member for driving the latter, means conducting fuel from the exhaust side of said turbine means to said combustion chamber, bypass means for controlling the amount of fuel bypassing said turbine means to control the turbine speed and the output of said pump, a combustion supporting fluid, pump means including a drive member connected to said turbine means, and a conduit for conducting fuel bypassed by said bypass means to said combustion chamber.

5. A rocket power plant having a combustion chamber, an exhaust nozzle receiving gases from said combustion chamber, a source of oxidizer, an oxidizer pump, means conducting oxidizer from said oxidizer pump directly to said chamber, a heat exchanger adjacent said nozzle, a source of liquid hydrogen fuel, separate means for conducting said fuel from said source to said heat exchanger including a fuel pump, said fuel being increased in temperature in said heat exchanger, a turbine, means for conducting fuel from said heat exchanger to said turbine, said fuel expanding through said turbine to drive the same, means mechanically connecting said fuel and oxidizer pumps for being driven by said turbine, a bypass valve for controlling the amount of fuel bypassing said turbine to control the output of said turbine and said pumps, and a conduit for conducting fuel bypassed by said bypass valve to said combustion chamber.

6. A rocket power plant including a combustion chamber, said combustion chamber comprising an imperforate outer casing and an inner coaxially disposed perforated member having walls spaced inwardly from said outer casing and forming an annular chamber therebetween, a convergent-divergent exhaust nozzle receiving gases from said combustion chamber, a source of liquid oxidizer, a heat exchanger adjacent said nozzle, a source of liquid cryogenic fuel, means for conducting fuel from said source to said heat exchanger including a fuel pump, said fuel being increased in temperature in said heat exchanger, a turbine driven by said fuel and located downstream of said heat exchanger, said fuel pump including a driving member being driven by said turbine, a conduit including a bypass valve for controlling the amount of fuel bypassing said turbine, means for conducting the exhaust flow from said turbine and the flow bypassed by said bypass valve to said annular chamber in said combustion chamber, an oxidizer pump for drawing oxidizer from said oxidizer source, said oxidizer pump being driven by said turbine, and means for conducting oxidizer in its liquid state from said oxidizer pump to the inside of perforated member of said combustion chamber to mix with said fuel.

7. A rocket power plant including a combustion chamber, a convergent-divergent exhaust nozzle receiving gases from said combustion chamber, a source of liquid cryogenic oxidizer, a heat exchanger adjacent said nozzle, a source of liquid cryogenic fuel, means for conducting fuel from said source to said heat exchanger including a fuel pump, said fuel being increased in temperature in said heat exchanger, a turbine driven by said fuel and located downstream of said heat exchanger, said fuel pump being driven by said turbine, a conduit including a bypass valve for controlling the amount of fuel bypassing said turbine, means for conducting the exhaust flow from said turbine and the flow bypassed by said bypass valve to said combustion chamber, an oxidizer pump for drawing oxidizer from said oxidizer source, said oxidizer pump being driven by said turbine, and means separate from said first mentioned conducting means for conducting oxidizer in its liquid state from said oxidizer pump to the inside of said combustion chamber to mix with said fuel.

References Cited in the file of this patent

UNITED STATES PATENTS

| | | |
|---|---|---|
| 1,310,253 | Shuman | July 15, 1919 |
| 1,757,855 | Chilowsky | May 6, 1930 |
| 2,091,808 | Dake | Aug. 31, 1937 |
| 2,183,313 | Goddard | Dec. 12, 1939 |
| 2,483,045 | Harby | Sept. 27, 1949 |
| 2,589,215 | Atwood | Mar. 18, 1952 |
| 2,610,464 | Knoll | Sept. 16, 1952 |
| 2,620,625 | Phaneuf | Dec. 9, 1952 |
| 2,697,482 | Blizard | Dec. 21, 1954 |
| 2,701,445 | Andrews et al. | Feb. 8, 1955 |
| 2,704,438 | Sheets | Mar. 22, 1955 |
| 2,743,577 | Malick | May 1, 1956 |
| 2,769,304 | Burton | Nov. 6, 1956 |
| 2,785,532 | Kretschmer | Mar. 19, 1957 |
| 2,828,605 | Dobson | Apr. 1, 1958 |
| 2,902,823 | Wagner | Sept. 8, 1959 |
| 2,992,527 | Masnik et al. | July 18, 1961 |

FOREIGN PATENTS

| | | |
|---|---|---|
| 918,316 | France | Oct. 14, 1946 |